Oct. 4, 1960 E. E. KOCH ET AL 2,954,656
HAY CRIMPER
Filed Dec. 29, 1958 2 Sheets-Sheet 1

INVENTORS
EMMETT F. GLASS +
EARL E. KOCH
Joseph Allen Brown
ATTORNEY

Oct. 4, 1960  E. E. KOCH ET AL  2,954,656
HAY CRIMPER
Filed Dec. 29, 1958  2 Sheets-Sheet 2

INVENTORS
EMMETT F. GLASS +
EARL E. KOCH
Joseph Allen Brown
ATTORNEY

United States Patent Office 2,954,656
Patented Oct. 4, 1960

2,954,656

HAY CRIMPER

Earl E. Koch, Mohnton, and Emmett F. Glass, Akron, Pa., assignors to Sperry Rand Corporation, New Holland, Pa., a corporation of Delaware Filed Dec. 29, 1958, Ser. No. 783,344

4 Claims. (Cl. 56—1)

This invention relates generally to agricultural machinery, and more particularly to hay crimpers adapted to crack the stems of previously cut crop material to facilitate drying. Still more specifically, the invention relates to shrouding a bearing of a crimper roll.

In recent years, the treating of cut crop material to speed up drying or curing has come into increasing use. If a crop is rained on after it is cut, such seriously damages the crop and reduces the feed value of the material. It is desirable therefore to get crop material into storage as quickly as possible after it has been cut for harvest.

After hay is mowed, it must be allowed to stand in the field for a period of time until it is sufficiently dry for baling or other harvesting procedure. While the hay leaves dry readily, the stems ordinarily take a considerably longer period of time. By using a crimper soon after the hay is cut, the stems can be cracked and split open whereby moisture in the stems will run out and the stems will dry more quickly.

A crimper of the type referred to is shown in U.S. Patent No. 2,711,622, issued June 28, 1955. Such machine has a pair of cooperative rolls, each of which has transverse slats or ribs. The ribs on the respective rolls intermesh to produce a crimping of material passed between them. Further, one roll is driven from a power source. Such one roll due to its intermeshing with the other roll provides a drive for such other roll.

As shown in the patent, one roll is disposed rearwardly of the other roll. The rearward roll constitutes the pick-up and it is over this roll that the crop material passes when it is crimped. The material passes beneath the structure which supports the forward roll. However, it passes over the respective ends of the rearward roll. In certain crop materials there is a tendency to wrap. When wrapping occurs, the intermeshing ribs or teeth of the rolls tend to squeeze the material and extrude it laterally toward the respective ends of the rolls. This has caused considerable difficulty with the pick-up or rearward roll in that such extruded crop material becomes forced into the bearing mountings at the respective ends of the roll. The buildup of material and relative rotation of various parts of the structure cause a heating which in time results in the bearing mountings becoming packed solid and failing. It has been found that the bearings for the rearward or pick-up roll have a very short life and require replacement after only moderate use of the machine.

One object of this invention is to provide a crimper roll bearing enclosure structure which will prevent material from passing from the roll to the bearing.

Another object of this invention is to provide cooperative bearing shrouds, one of which is disposed fixedly relative to the bearing carrier and the other of which is rotatable with the crimper roll.

Another object of this invention is to provide a bearing enclosure of the character described which has a tendency to shed material during the operation of the machine and throw off accumulated material after a wrapping situation has developed.

A further object of this invention is to provide means for protecting a bearing from becoming clogged with crop material and designed to resist movement of material toward the bearing in more than one direction.

A still further object of this invention is to accomplish the above objects with a structure which is relatively simple, yet capable of greatly reducing bearing failures with only a moderate increase in the structure of the bearing supports.

Other objects of this invention will be apparent hereinafter from the specification and from the recital in the appended claims.

Figure 1:
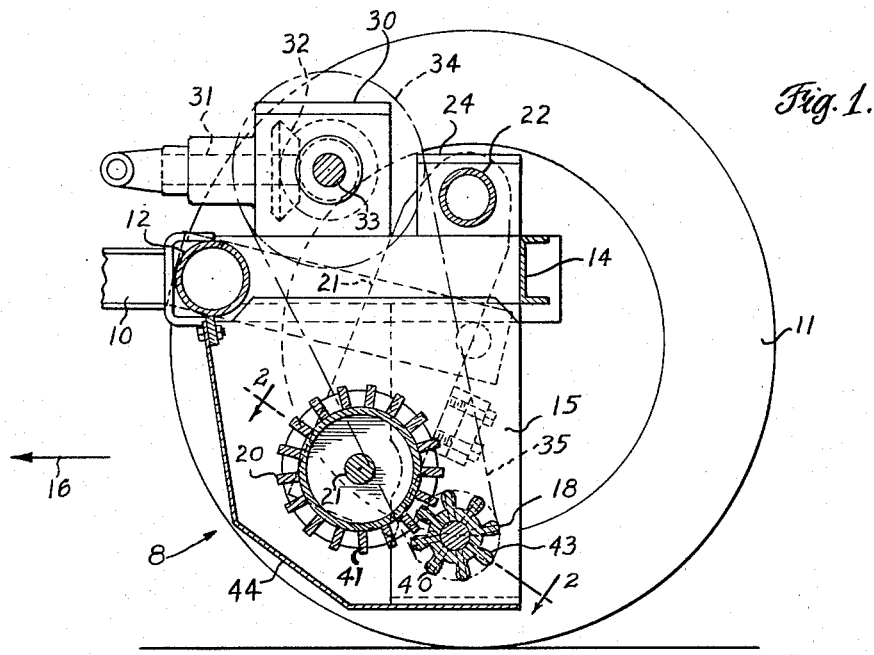
Fig. 1 is a fragmentary vertical section through a crimper and showing the relative positioning of the crimper rolls.
Figure 2:
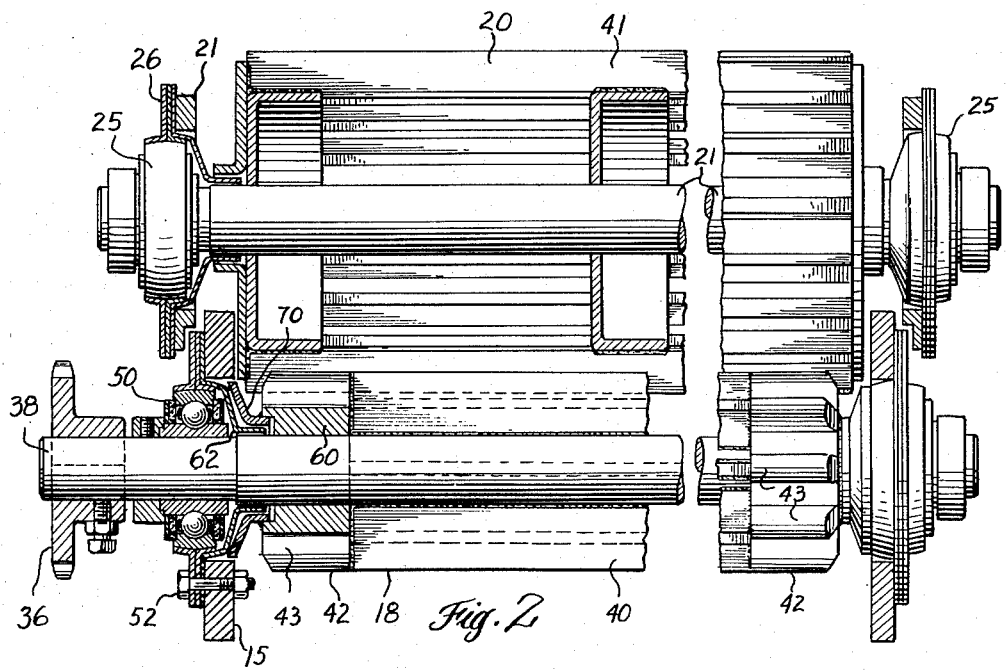
Fig. 2 is an enlarged section taken on the line 2—2 of Fig. 1, looking in the direction of the arrows, and showing the bearing mounting for the pick-up roll of the crimper rolls, such mounting being constructed according to one embodiment of this invention.

Referring now to the drawings by numerals of reference, 8 denotes generally a crimping machine comprising a frame 10 supported on a pair of laterally spaced ground wheels 11, one of which is shown. Frame 10 includes a cross pipe 12, disposed forwardly and a cross-brace member 14 positioned rearwardly. Affixed to frame 10 are a pair of laterally spaced side plates 15 which extend vertically and parallel to each other. Extending transversely relative to the direction of travel of the machine, indicated by the arrow 16, is a first crimper roll 18 which constitutes the pick-up for the machine. Roll 18 is supported on the side plates 15 for rotation relative thereto by the structure of this invention, which will be subsequently described.

Cooperative with crimper roll 18 is a roll 20 rotatably supported on arms 21 pivotally connected to a cross pipe 22. The cross pipe 22 is carried on upwardly extending stanchions 24 at the respective sides of the machine. Roll 20 includes a shaft 21, the respective ends of which project through the support arms 21. Shaft 21 is journaled at its ends in bearings 25. Each bearing 25 is mounted in a flangette carrier 26 suitably fastened to its associated arm 21.

Mounted on frame 10 is a gear box 30 which receives power from an input shaft 31 through beveled gearing 32. Power is transmitted from the gear box through a drive shaft 33 to a sprocket 34. Sprocket 34 drives through an endless chain 35 to a sprocket 36 connected to the shaft 38 for crimper roll 18.

The respective crimping rolls have transverse ribs or teeth which are denoted 40 and 41 for rolls 18 and 20, respectively. The ribs on the respective rolls intermesh. Further, roll 18 is provided at its respective ends with gear sections 42 having teeth 43 registering longitudinally with the ribs 40. The teeth 43 on the gears 42 are rounded as shown best in Fig. 1. It is these teeth which engage the ribs 41 on the crimper roll 20 and when crimper roll 18 is rotated by endless chain 35, a drive is transmitted to roll 20. The gear sections maintain the respective crimper rolls in proper relative rotatable position and provide a more positive drive.

When the machine travels toward the left of Fig. 1, the lower crimper roll 18 engages the crop material and directs the material toward the bight formed between its ribs 40 and the ribs 41 on the roll 20. The respective rolls rotate in opposite directions and pass the crop material between themselves. Such material is cracked as it passes between the rolls, the stems of the material being bent into a zigzag configuration by the rolls.

It will be noted that the crop material passes under crimper roll 20 but over the crimper roll 18. The bearings 25 supporting the upper crimping roll are, therefore, not subjected to the same conditions as the structure supporting the lower roll. While guards 44 (Fig. 1) are provided at the respective ends of the machine to block off material from moving directly onto the supports for roll 18, some material, nevertheless, passes over them.

Figure 3:
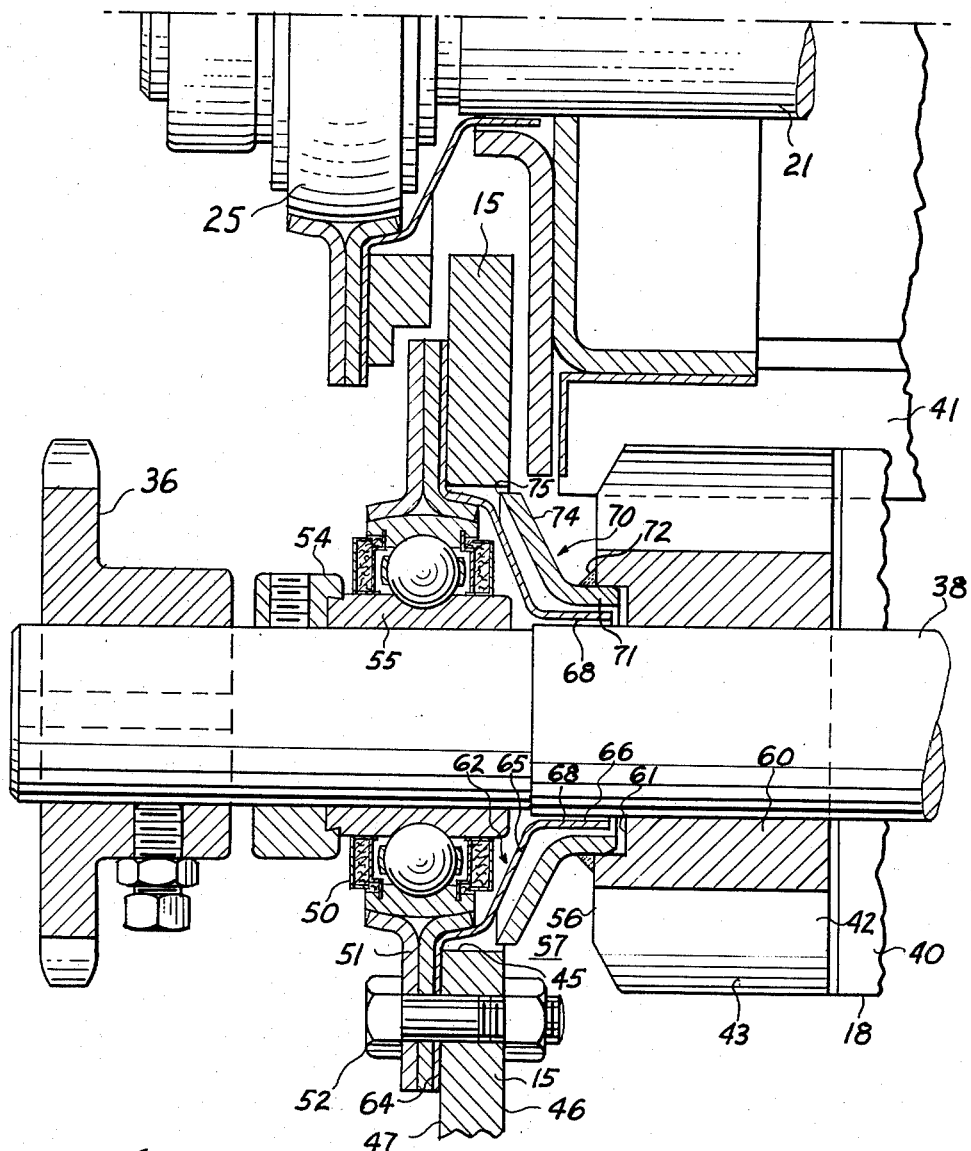
Fig. 3 is a view showing the bearing mounting on a greatly enlarged scale to indicate the specific features of the enclosure employed.

The above structure is conventional and is merely recited to establish the environment of applicants' improvement which resides in the mounting structure for the ends of the lower roll. Such structure will now be described, see Fig. 3.

Each end of shaft 38 of roll 18 passes through an opening 45 in the adjacent support plate 15. Support plate 15 has an inside wall portion 46 and an outside wall portion 47. Surrounding shaft 38 is a ball-bearing 50 which is mounted in a flangette carrier 51 which abuts against outside face 47 and is fastened to plate 15 by bolts 52. A retainer 54 is provided to lock the inner race 55 of the bearing in place.

There is a space 57 between the inside wall 46 of the support plate 15 and the adjacent end 56 of crimper roll 18. The adjacent gear 42 has a hub 60 affixed to the shaft 38. Hub 60 is recessed at 61 thereby providing an annular space facing toward bearing 50. Interposed between gear 42 and bearing 50 is a protective shroud 62 having a portion 64 which extends along the outside wall 47 of support plate 15. From there the shroud extends through the opening 45 and toward the periphery of shaft 38. A portion 65 of the shroud is inclined inwardly from the portion 64. Adjacent shaft 38, shroud 62 has a portion 66 extending parallel to the axis of the shaft and into the recess 61. Shroud 62 constitutes a fixed shroud. It is fastened to the support plate 15 and has no movement relative thereto. The shaft 38 for the crimper roll rotates relative to this shroud.

To prevent material from passing from the roll 18 and through the space 68 between portion 66 of shroud 62 and shaft 38 and into the bearing 50, preventing means is provided in the form of a movable shroud 70 having a portion 71 spaced from and surrounding the portion 66 of shroud 62. The portion 71 is welded at 72 to the hub 60 of gear 42. Shroud 70 has a portion 74 which extends generally parallel to the portion 65 of the shroud 62. It will also be noted that the end 75 of shroud 70 is free and projects into the opening 45, the outside diameter of shroud 70 being slightly less than the diameter of the opening.

The welding 72 renders shroud 70 integral with the hub 60 of the gear 42. If desired shroud 70 and gear 42 could be cast as one piece. Material moving longitudinally relative to roll 18 is unable to move against shroud 62, since it is directed against the axially and outwardly directed portion 74 of shroud 70. The material is caused to move away from the portion 66 of the shroud 62, there being a tendency for the material to slide along the surface of portion 74 of shroud 70 and then to the side plate 15 and discharge. Material moving along the inside wall 46 of side plate 15 and toward the bearing 50 is likewise directed away from the shroud 62 by the movable shroud 70. Since the radial edge 75 of shroud 70 projects into opening 45, any material moving along the side wall 46 must turn a ninety degree angle to enter the opening 45. Thereafter, it must make another sharp turn to move through the space between the respective shrouds. Then it must move axially inwardly and around the portion 66 of the shroud 62 before it can pass between the shroud 62 and shaft 38 and get to the bearing 50.

When the crimper is operated, if wrapping occurs, material extruded longitudinally by the intermeshing teeth 40—41 of the respective rolls is directed by shroud 70 away from the bearing 50 and the fixed shroud 62. When the roll becomes cleared, any accumulated material in space 57 will tend to be thrown free by centrifugal force.

The above structure, while being simple and inexpensive, solves at low cost a heretofore irksome problem. While the invention has been described in connection with a particular embodiment thereof, it will be understood that it is capable of further modification and this application is intended to cover any variations, uses or adaptations of the invention following in general the principles of the invention as come within known or customary practice in the art to which the invention pertains or as comes within the scope of the invention and the limits of the appended claims.

Having thus described our invention, what we claim is:

1. A hay crimper having a fixed vertically extending support plate, a horizontally extending crimper roll, said plate having an inside wall portion adjacent said roll, an outside wall portion remote from the roll and an opening therethrough, a rotatable shaft connected to said roll and projecting therefrom through said opening, a bearing on said shaft and adjacent said outside wall portion, means connecting said bearing to said plate and supporting said roll on the plate, and means resisting axial movement of hay from said one end of said roll into said opening and toward said bearing and inward radial movement of hay along said inside wall portion and toward said shaft, said resisting means comprising a pair of cooperative axially spaced shrouds surrounding and extending radially relative to said shaft, one of said pair of shrouds being a fixed shroud and having an outer end fixed to said plate and an inner free end closely surrounding said rotatable shaft, the other of said shrouds being rotatable with said shaft relative to said one shroud and having an inner radial end fixed relative to said shaft and a free radial outer end, said other shroud having a diameter less than the diameter of said opening and having a part at least of said free radial outer end located axially beyond said inside wall portion and toward said outside wall portion of said side plate.

2. A hay crimper as recited in claim 1 wherein said radial inner ends of said shrouds have sleeves coaxial with said shaft and with each other, the sleeve on said fixed shroud being closer to said shaft than the sleeve on said movable shroud, and the sleeve on the movable shroud surrounding a portion of the sleeve on the fixed shroud.

3. A hay crimper as recited in claim 1 wherein said roll has a hub provided with an annular recess surrounding said shaft and opened toward said support plate, said radial inner ends of said shrouds projecting into said recess.

4. A hay crimper as recited in claim 1 wherein both of said shrouds are inclined relative to a plane perpendicular to the axis of said shaft, the radial outer ends of said shrouds being closer to said bearing than the radial inner ends.

References Cited in the file of this patent

UNITED STATES PATENTS

| | | |
|---|---|---|
| 2,702,868 | Kindig | Feb. 22, 1955 |
| 2,711,622 | Cunningham | June 28, 1955 |
| 2,827,344 | Maag | Mar. 18, 1958 |